(12) United States Patent
Usami

(10) Patent No.: US 6,341,175 B1
(45) Date of Patent: Jan. 22, 2002

(54) METHOD OF CONVERTING COLOR DATA

(75) Inventor: Yoshinori Usami, Minamiashigara (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/181,666

(22) Filed: Oct. 29, 1998

(30) Foreign Application Priority Data

Nov. 5, 1997 (JP) ............................................. 9-302859
Dec. 1, 1997 (JP) ............................................. 9-330217

(51) Int. Cl.$^7$ ................................................ G06K 9/00
(52) U.S. Cl. ..................................... 382/167; 358/518
(58) Field of Search ............................... 382/167, 162; 358/504, 518, 1.9, 520, 523

(56) References Cited

U.S. PATENT DOCUMENTS 5,285,297 A * 2/1994 Rose et al. .................. 358/518
6,043,909 A * 3/2000 Holub .......................... 358/504
6,075,888 A * 6/2000 Schwartz ..................... 382/167

FOREIGN PATENT DOCUMENTS

| JP | 3-131920 | 6/1991 | ............. G06F/3/12 |
| JP | 4-362869 | 12/1992 | ............. H04N/1/40 |

* cited by examiner

Primary Examiner—Leo Boudreau
Assistant Examiner—Ali Bayat
(74) Attorney, Agent, or Firm—Sughrue Mion, PLLC

(57) ABSTRACT

Forward conversion functions for converting device data under output conditions into calorimetric values are determined, and an inverse conversion function with a remaining color other than three colors of the device data being fixed to a predetermined value is determined. Color data are converted between different output conditions using the forward conversion functions and the inverse conversion function.

12 Claims, 6 Drawing Sheets

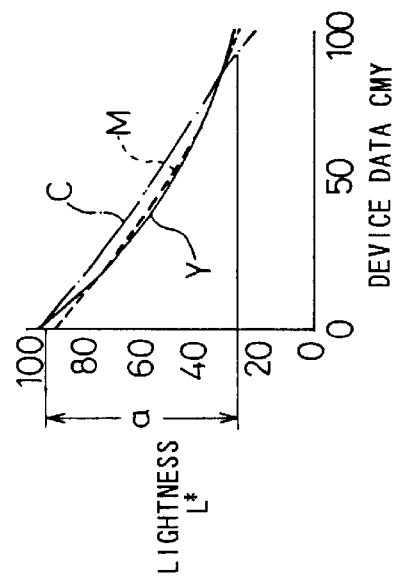
FIG. 2A  OUTPUT CONDITIONS A
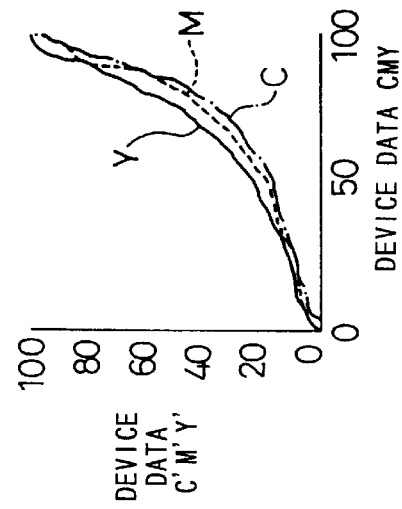
FIG. 2D
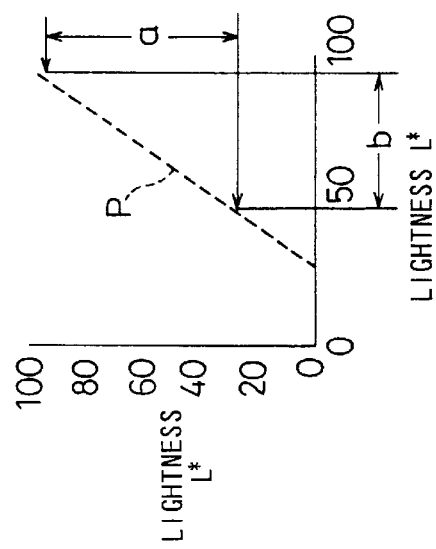
FIG. 2B
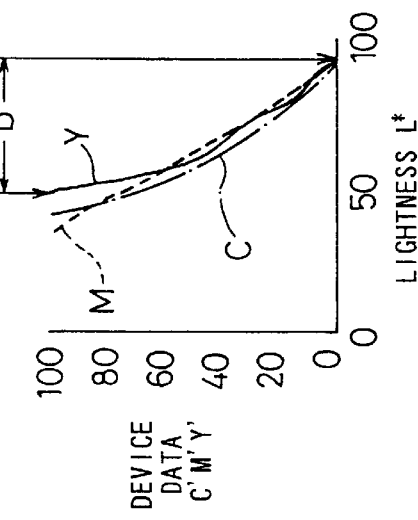
FIG. 2C  OUTPUT CONDITIONS B

METHOD OF CONVERTING COLOR DATA

BACKGROUND OF THE INVENTION

1. Field of the Invention

The present invention relates to a method of converting color data from four or more color device data, e.g., device data C, M, Y, K into device data C, M, Y, K under different output conditions.

2. Description of the Related Art

Image output devices for outputting a color image on an output medium such as a printed material or a CRT achieve halftone dot area modulation or density modulation on the output medium based on device data C, M, Y, K or R, G, B to reproduce a color image. Color characteristics of the reproduced color image depend on output conditions including the properties of color materials and output medium, e.g., an output sheet, phosphors, etc. and other printing conditions.

There have been proposed various methods for determining device data to obtain desired color images in view of such output conditions. For example, Japanese laid-open patent publication No. 3-131920 discloses a process of carrying out direct mapping using a color conversion table determined with a certain printer or under certain printing conditions to determine device data. Japanese laid-open patent publication No. 4-362869 reveals a process of determining a solution of maximum likelihood for the coefficient of a masking process such that colorimetric values of different image output devices will be equalized, and obtaining device data using the determined coefficient.

An image output device for producing a colored printed material is desired to produce variations of an image to be outputted. For example, the image output device is required to select a color material and an output medium, and adjust the amount of the selected color material to obtain a desired image. The conventional processes described above, however, fail to carry out highly accurate color conversions to meet such a requirement.

For generating a color printed material, it is customary to use four colors C, M, Y, K as device data. In order to map device data C, M, Y, K of a source device into device data C', M', Y', K' of a destination device under different output conditions, it is necessary to convert the device data C, M, Y, K into device-independent colorimetric values L*, a*, b*, and then convert the calorimetric values L*, a*, b*, into the device data C', M', Y', K'. Since the device data C', M', Y', K' comprise four variables whereas the colorimetric values L*, a*, b* comprise three variables, accurate conversion relationships cannot be attained by the above conventional processes. For generating a printed material, in particular, conversion relationships need to be established so as to preserve an attentional color such as of gray and reduce the sacrifice of other colors. It is the current practice to set up such conversion relationships with a large expenditure of time and labor.

SUMMARY OF THE INVENTION

It is a general object of the present invention to provide a method of converting color data very easily between sets of four or more device data under different output conditions to obtain desired colors.

A major object of the present invention is to provide a method of converting color data very easily between sets of four or more device data under different output conditions while preserving a gray balance to obtain desired colors with a preserved gray balance.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 2A through 2D are diagrams illustrative of conversion relationships for device data in the method of converting color data;

DESCRIPTION OF THE PREFERRED EMBODIMENTS

Figure 1:
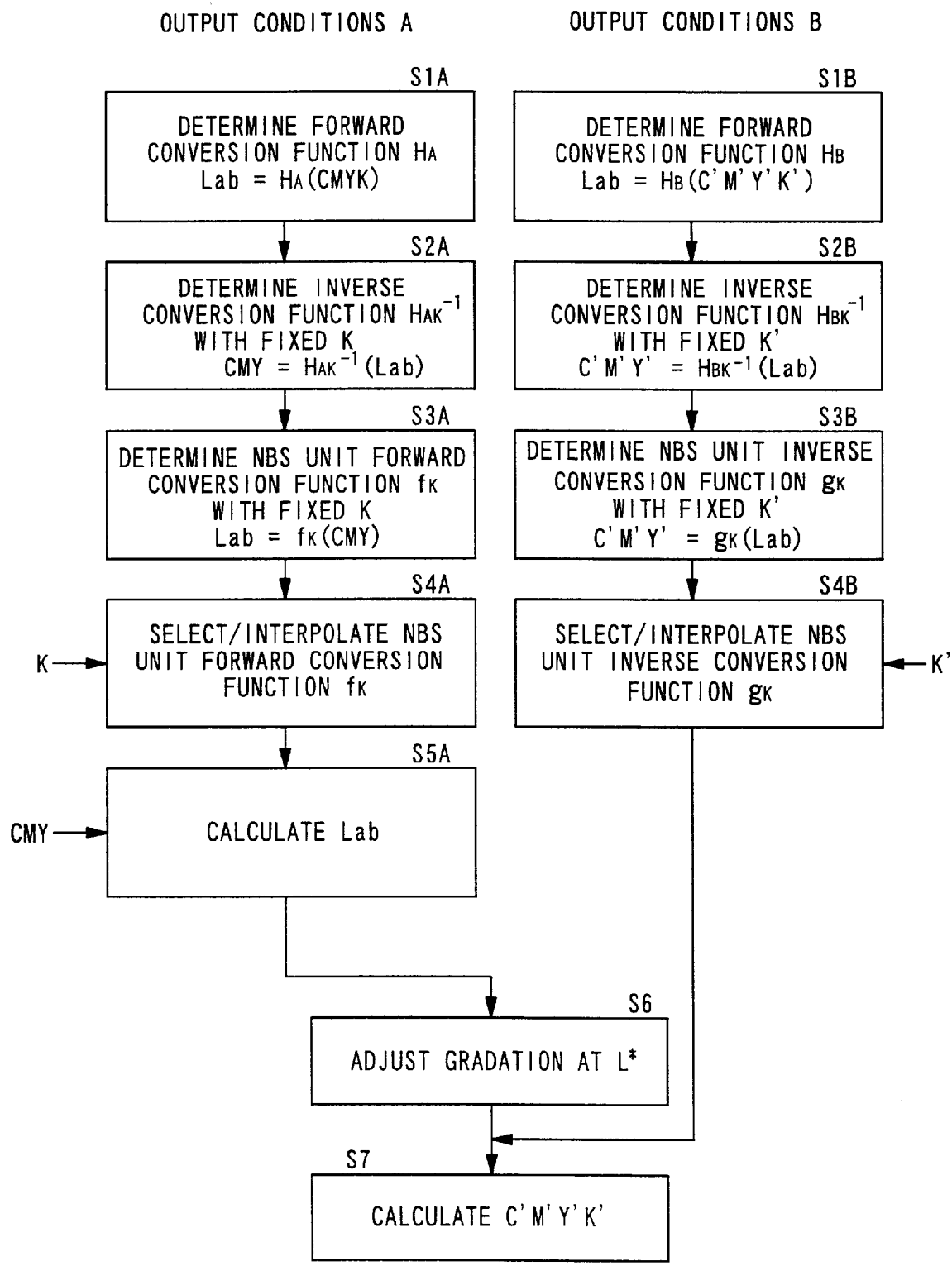
FIG. 1 is a flowchart of a method of converting color data according to an embodiment of the present invention.

FIG. 1 shows a flowchart of a method of converting color data according to an embodiment of the present invention. The method of converting color data will be described below with respect to the mapping of device data C, M, Y, K of a source device, i.e., an image output device which generates a printed material under output conditions A that are printing conditions including inks, a print sheet, a printing pressure, etc., into device data C', M', Y', K' of a destination device, i.e., another image output device which generates a printed material under output conditions B, different from the output conditions A, with respect to color reproducing characteristics such as a reproduction range (gamut) or the like. The device data may include a certain color other than colors C, M, Y, K, or may be a color combination other than the colors C, M, Y, K.

In FIG. 1, reference characters with a prefix S represent steps of the method of converting color data. The steps of the method of converting color data will be described below with reference to FIG. 1.

Steps S1A, S1B:

First, forward conversion functions $H_A$, $H_B$ (forward conversion relationships) for deriving device-independent colorimetric values L*, a*, b* (hereinafter also referred to as "colorimetric values Lab") from device data C, M, Y, K or C', M', Y', K' (hereinafter also referred to as "device data CMYK or C'M'Y'K'"') under output conditions A, B are determined. The forward conversion relationships may be determined using device-independent common color space data such as calorimetric values L*, u*, v*, tristimulus values X, Y, Z, or the like, rather than the calorimetric values Lab according to the CIE calorimetric system.

For determining the forward conversion function $H_A$, a plurality of color patches based on device data CMYK that vary by increments of 10% are generated by an image output device set to the output conditions A, and colorimetric values Lab of the color patches are measured by a colorimeter thereby to determine a mapping of the colorimetric values Lab on an irregular grid from the device data CMYK on a regular grid. Then, from the mapping relationship thus determined, the forward conversion function $H_A$ that is capable of determining the calorimetric values Lab from the arbitrary device data CMYK according to:

Lab=$H_A$(CMYK)

is determined using a maximum likelihood square method for minimizing an error.

For example, according to the maximum likelihood square method, the relationship between the device data CMYK and the calorimetric values Lab is determined as follows: If the device data CMYK of the color patches are represented by C1, M1, Y1, K1, ..., Ck, Mk, Yk, Kk, their colorimetric values Lab by L1, a1, b1, ..., Lk, ak, bk, coefficients for linearly coupling the device data CMYK and the colorimetric values Lab by a0, a1, ..., am, and they are defined by:

$$\begin{pmatrix} L1 \\ L2 \\ \vdots \\ Lk \end{pmatrix} = VL \quad \begin{pmatrix} 1 & C1 & M1 & Y1 & K1 & \cdots \\ 1 & C2 & M2 & Y2 & K2 & \cdots \\ \vdots & \vdots & \vdots & \vdots & \vdots & \cdots \\ 1 & Ck & Mk & Yk & Kk & \cdots \end{pmatrix} = ML \quad \begin{pmatrix} a0 \\ a1 \\ \vdots \\ am \end{pmatrix} = AL$$

then the relationship between the colorimetric value L* and the device data CMYK can be determined as VL=ML·AL. Similarly, the relationship between the colorimetric value a* and the device data CMYK can be determined as Va=Ma·Aa, and the relationship between the colorimetric value b* and the device data CMYK can be determined as Vb=Mb·Ab.

If an error produced when the maximum likelihood solution AL is represented by e and the transposed matrix of the matrix VL by $VL^T$, then the error e is expressed by:

$$e = \|VL - ML \cdot AL\|^2$$
$$= (VL - ML \cdot AL)^T \cdot (VL - ML \cdot AL)$$

The maximum likelihood solution AL for minimizing the error e is determined as:

AL=($ML^T$·ML )·$ML^T$·VL

The maximum likelihood solutions Aa, Ab can similarly be determined. Using these maximum likelihood solutions AL, Aa, Ab, the forward conversion function $H_A$ that is capable of determining the calorimetric values Lab from the arbitrary device data CMYK is obtained.

Likewise, color patches are generated by an image output device that is set to the output conditions B, and colorimetric values Lab of the color patches are measured. Thereafter, the forward conversion function $H_B$ that is capable of determining the colorimetric values Lab from the arbitrary device data C'M'Y'K' according to:

Lab=$H_B$(C'M'Y'K')

is determined using a maximum likelihood square method for minimizing an error.
Steps S2A, S2B:

In the forward conversion functions $H_A$, $H_B$ that have been determined in steps S1A, S1B, the device data K (K') is fixed to a given value, and inverse conversion functions (inverse conversion relationships) $H_{AK}^{-1}$, $H_{BK}^{-1}$ that are capable of determining device data CMY (C'M'Y') from the arbitrary calorimetric values Lab according to:

CMY=$H_{AK}^{-1}$(Lab)

C'M'Y'=$H_{BK}^{-1}$(Lab)

are determined for each device data K (K'). The calorimetric values Lab obtained from the device data CMY (C'M'Y') are generally arranged on an irregular grid, and cannot be determined simply by inversely calculating the device data CMY (C'M'Y') with respect to the arbitrary calorimetric values Lab. Therefore, the inverse conversion functions $H_{AK}^{-1}$, $H_{BK}^{-1}$ are determining using a successive approximation method.

A process of calculating the inverse conversion functions $H_{AK}^{-1}$, $H_{BK}^{-1}$ using the Newton's method which is a typical successive approximation method will be described below.

First, it is assumed that arbitrary target values for the colorimetric values Lab are represented by L0*, a0*, b0*, and an allowable error for repetitive calculations by ΔEmin. Then, known initial values of the device data CMY (C'M'Y') are set to C1, M1, Y1, and calorimetric values L1*, a1*, b1* with respect to the device data C1, M1, Y1 are determined using the forward conversion functions $H_A$, $H_B$ that have been determined in steps S1A, S1B. An error ΔE between the target values L0*, a0*, b0* and the colorimetric values L1*, a1*, b1* is calculated, and compared with the allowable error ΔEmin. If the absolute value of the error ΔE is not smaller than the allowable error ΔEmin, corrective values ΔC, ΔM, ΔY are calculated to correct the initial values C1, M1, Y1, and the above process is repeated.

The corrective values ΔC, ΔM, ΔY can be determined as follows: If it is assumed that the colorimetric values Lab with respect to the device data CMY are linear in a small range, then the corrective values ΔC, ΔM, ΔY and small changes ΔL*, Δa*, Δb* of the colorimetric values Lab satisfy the following relationship:

$$\begin{pmatrix} \Delta L^* \\ \Delta a^* \\ \Delta b^* \end{pmatrix} = \begin{pmatrix} \frac{\partial L^*}{\partial C} & \frac{\partial L^*}{\partial M} & \frac{\partial L^*}{\partial Y} \\ \frac{\partial a^*}{\partial C} & \frac{\partial a^*}{\partial M} & \frac{\partial a^*}{\partial Y} \\ \frac{\partial b^*}{\partial C} & \frac{\partial b^*}{\partial M} & \frac{\partial b^*}{\partial Y} \end{pmatrix} \begin{pmatrix} \Delta C \\ \Delta M \\ \Delta Y \end{pmatrix} = J \begin{pmatrix} \Delta C \\ \Delta M \\ \Delta Y \end{pmatrix}$$

where J is a Jacobian matrix. Therefore, the corrective values ΔC, ΔM, ΔY are determined as follows:

$$\begin{pmatrix} \Delta C \\ \Delta M \\ \Delta Y \end{pmatrix} = J^{-1} \begin{pmatrix} \Delta L^* \\ \Delta a^* \\ \Delta b^* \end{pmatrix}$$

By repeating calculations as described above, the inverse conversion functions $H_{AK}^{-1}$, $H_{BK}^{-1}$ that are capable of determining the device data CMY (C'M'Y') from the arbitrary colorimetric values Lab can be obtained.

When calculating the inverse conversion functions $H_{AK}^{-1}$, $H_{BK}^{-1}$ according to the successive approximation method that is the Newton's method, since the colorimetric values Lab and the device data CMY (C'M'Y') which are calculated may possibly fall outside of the color reproduction range of the image output device, it is necessary to establish the calorimetric values Lab and the device data CMY (C'M'Y') outside of the color reproduction range as hypothetical data using a linear combination equation typified by the Neugebauer equation.

A process of establishing hypothetical data using the Neugebauer equation will be described below. For the sake of brevity, it is assumed that an image is formed on a print sheet using inks of C and M. If it is assumed that colorimetric values Lab of the print sheet are represented by Dw, colorimetric values Lab of the ink of C by Dc, calorimetric values Lab of the ink of M by Dm, a halftone dot area ratio of the color C based on device data C by c, and a halftone dot area ratio of the color M based on device data M by m, then a calorimetric value S representative of the tristimulus values X, Y, Z is expressed by:

$$S=Dw\cdot(1-c)\cdot(1-m)+Dc\cdot c\cdot(1-m)+Dm\cdot m\cdot(1-c)+Dc\cdot Dm\cdot m\cdot c$$

The colorimetric values Dw, Dc, Dm, S are established with respect to each of the colorimetric values L*, a*, b*.

The Neugebauer equation for determining the colorimetric value S may be corrected in view of gradation reproduction characteristics (dot gain) inherent in the printing and non-additive characteristics between inks (trapping) for establishing hypothetical data closer to those used by an actual printing system. For example, the dot gain for a monochoromatic image can be corrected using a corrective formula by Yule and Nielsen, a corrective formula by Murray and Davies, or a corrective formula based on a simple polynomial approximation. Specifically, the corrective formula for the color C may be represented by dc(c), the corrective formula for the color M by dm(m), and the halftone dot area ratios c, m in the above Neugebauer equation may be replaced with c=dc(c) and m=dm(m) to produce hypothetical data taking the dot gain into account. If the calorimetric values Lab of the inks vary due to trapping or the like, then a change with respect to the color C may be represented by a function jc(Dc, c), a change with respect to the color M by a function jm(Dm, m), and the colorimetric values Dc, Dm in the above Neugebauer equation may be replaced with Dc=jc(Dc, c), Dm=jm(Dm, m) to produce hypothetical data taking the trapping into account.

The hypothetical data may alternatively be determined from the relationship between the calorimetric values Lab and the device data CMYK (C'M'Y'K') according to a linear programming method such as a maximum likelihood square method, rather than the Neugebauer equation.

Step S3A:

Using the inverse conversion function $H_{AK}^{-1}$ for each device data K, determined in step S2A, an NBS (Neutral Balance Scale) unit forward conversion function $f_K$ (gray balance preserving forward conversion relationship) is determined for each device data K, which is a mapping from the device data CMY into the colorimetric values Lab, capable of obtaining a complete neutral gray (a*=b*=0) under the output conditions A.

Specifically, device data CMY at the time a*=b*=0 are determined by the inverse conversion function $H_{AK}^{-1}$, and an NBS unit forward conversion function $f_K$ for obtaining the calorimetric values Lab from the arbitrary device data CMY according to:

$$Lab=f_K(CMY)$$

is determined per device data K. FIG. 2A shows the relationship between the device data CMY and the colorimetric values Lab (lightness L*), capable of obtaining a complete neutral gray with certain device data K under the output conditions A. A collection of NBS unit forward conversion functions $f_K$ thus determined for the respective device data K is defined as an NBS unit forward conversion function unit F.

Step S3B:

As in step S3A, using the inverse conversion function $H_{BK}^{-1}$ for each device data K', determined in step S2B, an NBS unit inverse conversion function $g_K$ (gray balance preserving inverse conversion relationship) is determined for each device data K', which is a mapping from the calorimetric values Lab into the device data C'M'Y', capable of obtaining a complete neutral gray (a*=b*=0) under the output conditions B, as follows:

$$C'M'Y'=g_K(Lab)$$

FIG. 2C shows the relationship between the device data C'M'Y' and the colorimetric values Lab (lightness L*), capable of obtaining a complete neutral gray with certain device data K' under the output conditions B. A collection of NBS unit inverse conversion functions $g_K$ thus determined for the respective device data K' is defined as an NBS unit inverse conversion function unit G.

Figure 3:
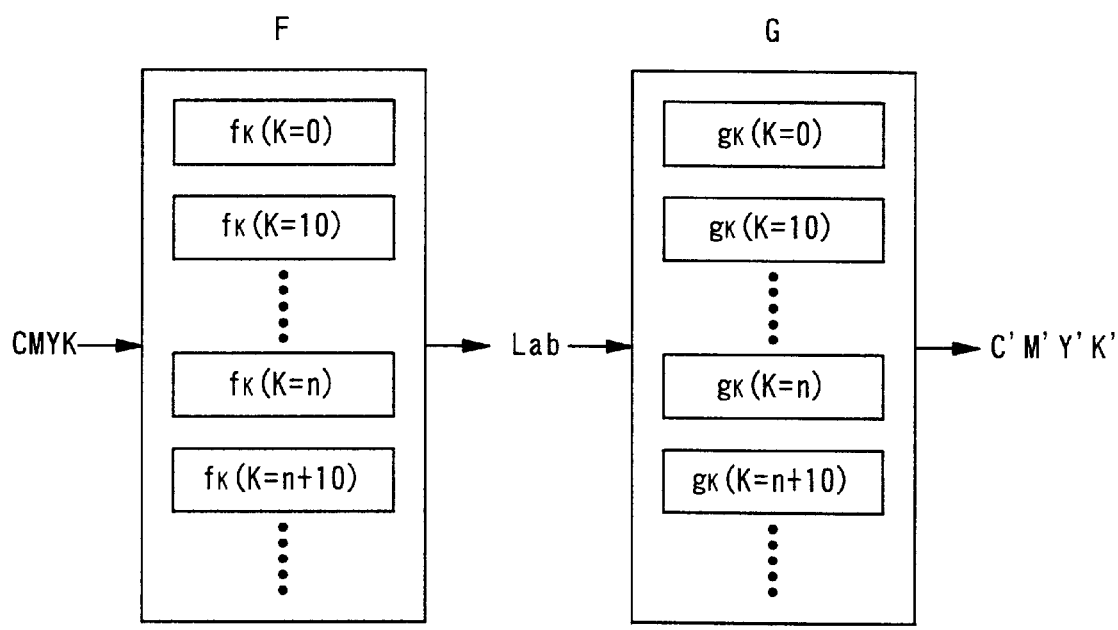
FIG. 3 is a diagram illustrative of a conversion relationship employing a gray balance preserving forward conversion relationship and a gray balance preserving inverse conversion relationship in the method of converting color data.

A process of converting the arbitrary device data CMYK under the output conditions A into the device data C'M'Y'K' under the output conditions B using the NBS unit forward conversion functions $f_K$ and the NBS unit inverse conversion functions $g_K$ which are thus prepared will be described below with reference to FIG. 3.

Step S4A:

An NBS unit forward conversion function $f_K$ corresponding to the device data K of the arbitrary device data CMYK under the output conditions A is selected from the NBS unit forward conversion function unit F. If there is no NBS unit forward conversion function $f_K$ corresponding to the device data K, then an NBS unit forward conversion function $f_K$ adjacent to the device data K, e.g., an NBS unit forward conversion function $f_{Kt}$ or an NBS unit forward conversion function $f_{Ks}$ which satisfies the relationship Kt≦K≦Ks is selected. An interpolating process will be described later on.

Step S5A:

Then, colorimetric values Lab of the arbitrary device data CMYK under the output conditions A are determined using the selected NBS unit forward conversion function $f_K$. If the arbitrary device data CMYK represent the color of gray, then it is guaranteed that calorimetric values Lab (a*=b*=0) accurately corresponding to the color of gray are obtained.

Step S4B:

An NBS unit inverse conversion function $g_K$ corresponding to the device data K' of the arbitrary device data C'M'Y'K' under the output conditions B is selected from the NBS unit inverse conversion function unit G. If there is no NBS unit inverse conversion function $g_K$ corresponding to the device data K', then an NBS unit inverse conversion function $g_K$ adjacent to the device data K', e.g., an NBS unit inverse conversion function $g_{K't}$ or an NBS unit inverse conversion function $g_{K's}$ which satisfies the relationship K't≦K'≦K's is selected. An interpolating process will be described later on.

Step 6:

Prior to determining device data C'M'Y' under the output conditions B from the colorimetric values Lab determined in step S5A and the NBS unit inverse conversion function $g_K$ determined in step S4B (step S7), a range in which data can be mapped between the output conditions A and the output conditions B is adjusted.

Specifically, in the image output devices with the output conditions A and the output conditions B, maximum and minimum densities of images that can be outputted from the image output devices are determined depending on the inks used and the density of print sheets used, and images whose densitites fall outside of the density range between those maximum and minimum densities cannot be formed by the image output devices. For example, as shown in FIG. 2A, an image can be formed with densities in a range a under the output conditions A, and as shown in FIG. 2C, an image can be formed with densities in a range b under the output conditions B. In order to adjust the range in which data can be mapped between the output conditions A and the output conditions B, a gradation conversion curve P shown in FIG. 2B is established. The gradation conversion curve P serves to convert colorimetric values Lab (lightness L*) under the output conditions A into calorimetric values Lab (lightness L*) under the output conditions B. By adjusting the shape of the gradation conversion curve P, it is possible to adjust the gradation of an image under the output conditions B as desired while preserving a gray balance.

Using the gradation conversion curve P thus established, the colorimetric values Lab determined in step S5A with respect to the arbitrary device data CMY under the output conditions A are converted into the colorimetric values Lab in the mapping range under the output conditions B.

Step 7:

The colorimetric values Lab determined as described above are applied to the NBS unit inverse conversion function $g_K$ selected in step S4B to determine device data C'M'Y'K' under the output conditions B.

FIG. 2D shows the relationship between the arbitrary device data CMYK under the output conditions A and the device data C'M'Y'K' under the output conditions B which have been determined as described above from the device data CMYK. The relationship shown in FIG. 2D may be established per device data K, and the device data C'M'Y'K' may be determined directly from the device data CMYK.

The device data C'M'Y'K' of the destination device can easily and highly accurately be determined from the device data CMYK of the source device while the gray balance is being preserved.

The process of interpolating the NBS unit forward conversion function $f_K$ and the NBS unit forward conversion function $g_K$ depending on the device data K (K') in steps S4A, S4B will be described below.

If the NBS unit forward conversion function $f_K$ is determined by internal division according to the device data under the output conditions A in the interpolating process, then NBS unit forward conversion functions $f_{Kt}, f_{Ks}$ corresponding to device data Kt, Ks (Kt≦K≦Ks) around the device data K, for example, are selected from the NBS unit forward conversion function unit F. Then, the NBS unit forward conversion functions $f_{Kt}, f_{Ks}$ are internally divided by an internal division ratio (Ks−K):(K−Kt) to determine a new NBS unit forward conversion function $f_K$ corresponding to the device data K. Then, a mapping from the device data CMY into the colorimetric values Lab can be determined using the NBS unit forward conversion function $f_K$. Similarly, an NBS unit forward conversion function $g_K$ can be determined by internal division.

For the internal division, the internal division ratio may be established on the basis of the lightness L* which is the colorimetric values Lab of the device data CMYK under the output conditions A.

Figure 4:
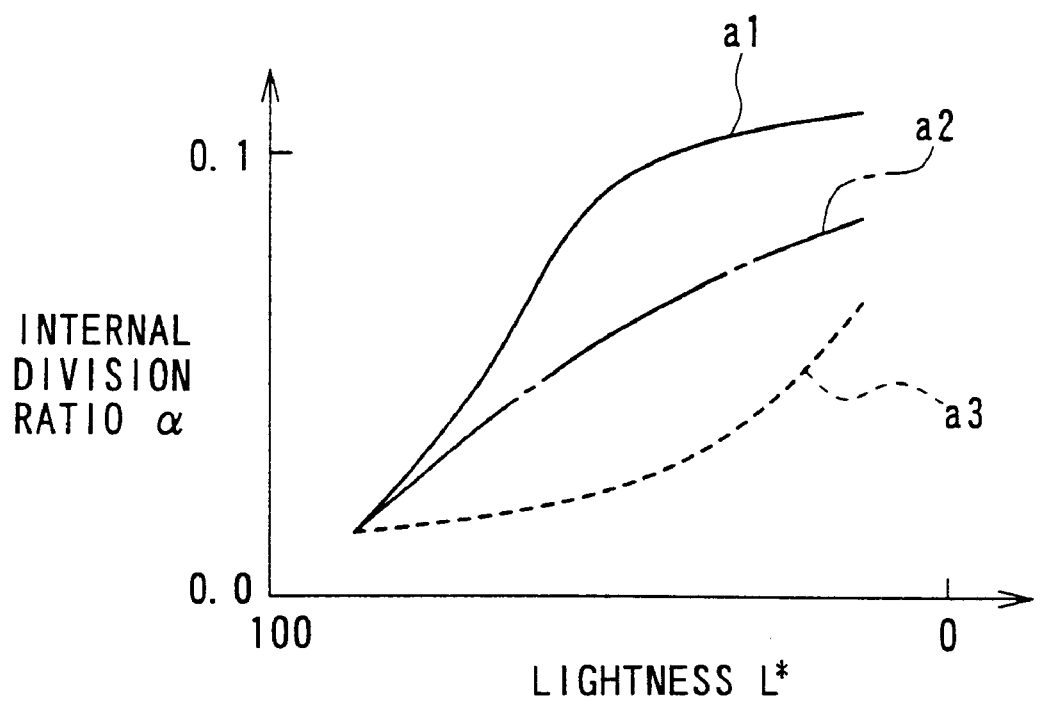
FIG. 4 is a diagram of a table for establishing an internal division ratio for the conversion relationships in the method of converting color data.

For example, using the forward conversion function $H_A$ (determined in step S1A) under the output conditions A, a lightness L* of the device data CMYK under the output conditions A is determined, and an internal division ratio a with respect to the determined lightness L* is determined by selecting a desired one of tables a1 through a3 shown in FIG. 4. Specifically, device data C'M'Y' under the output conditions B, for example, are determined as:

$$C'M'Y' = \alpha \cdot g_{Ks} + (1-\alpha) \cdot g_{Kt}$$

using the internal division ratio α determined from the tables a1 through a3. In this case, as the lightness L* is smaller, the device data K' increases and the device data C'M'Y' decrease.

Alternatively, using a histogram of the lightness L* and saturation of the device data CMYK under the output conditions A, internal division ratios may dynamically be established such that they are smaller with respect to brighter images and greater with respect to darker images. Specifically, a table of internal division ratios may be approximated by a polynomial, and the shape of the curve represented by the polynomial may be changed by being correlated to the values of the histogram.

Further alternatively, internal division ratios may be determined on the basis of object attributes of the device data CMYK (C'M'Y'K'). For example, if the device data CMYK (C'M'Y'K') represent a character image, then the internal division ratio a may be fixed to 1, and if the device data CMYK (C'M'Y'K') represent other images, then internal division ratio a may be established depending on the image.

In the above embodiment, the conversion from the four color device data CMYK of a source device into the four color device data C'M'Y'K' of a destination device has been described above. However, color data conversion may similarly be carried out between sets of five or more color device data. For example, if device data comprise five colors C, M, Y, K, B, then the device data K, B may be fixed, a gray balance preserving forward conversion relationship and a gray balance preserving inverse conversion relationship with respect to the remaining three color device data CMY may be determined per combination of the device data K, B, and color data conversion may be carried out between the device data CMYK and C'M'Y'K' based on the determined conversion relationships.

Figure 5:
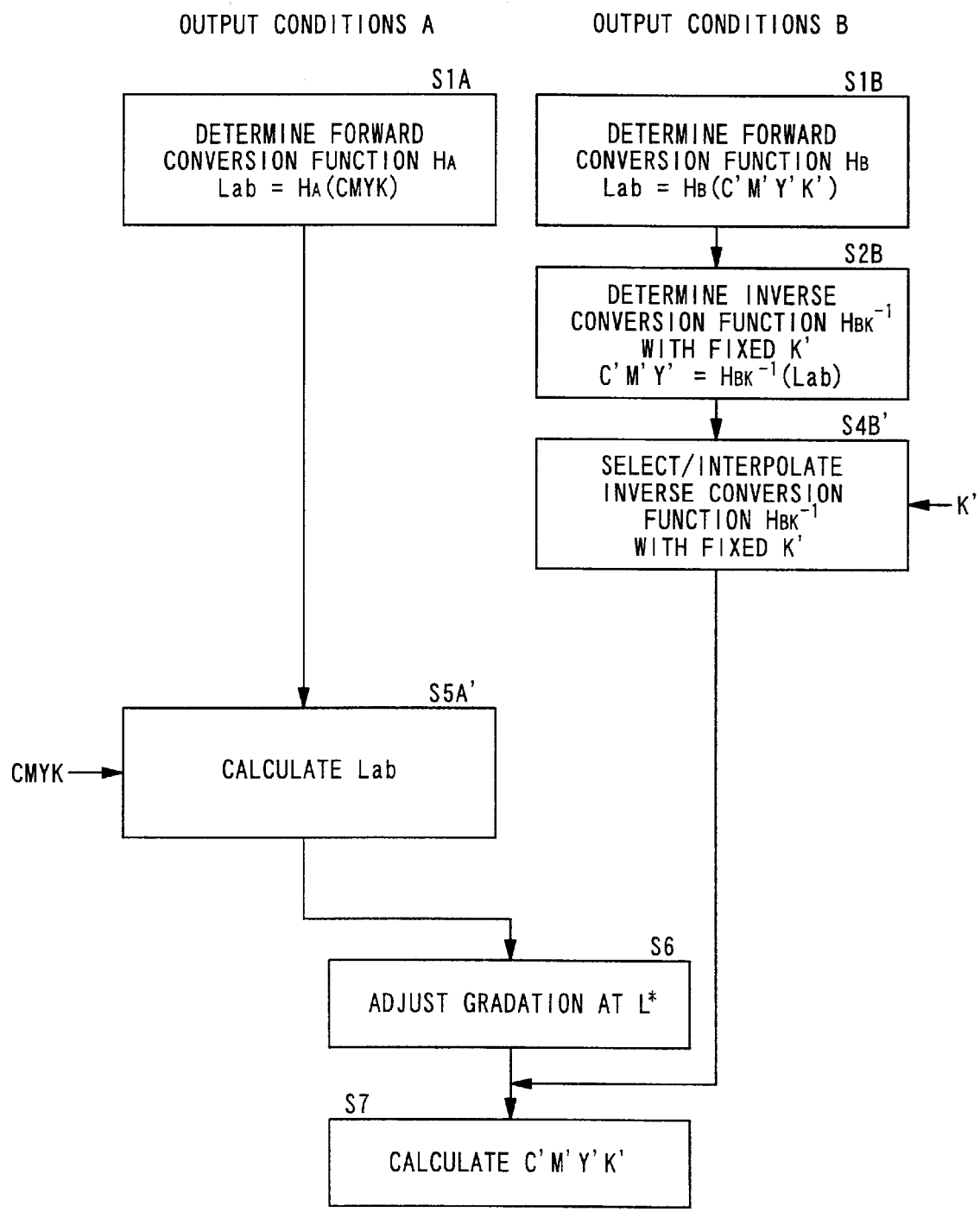
FIG. 5 is a flowchart of a method of converting color data according to another embodiment of the present invention.
Figure 6:
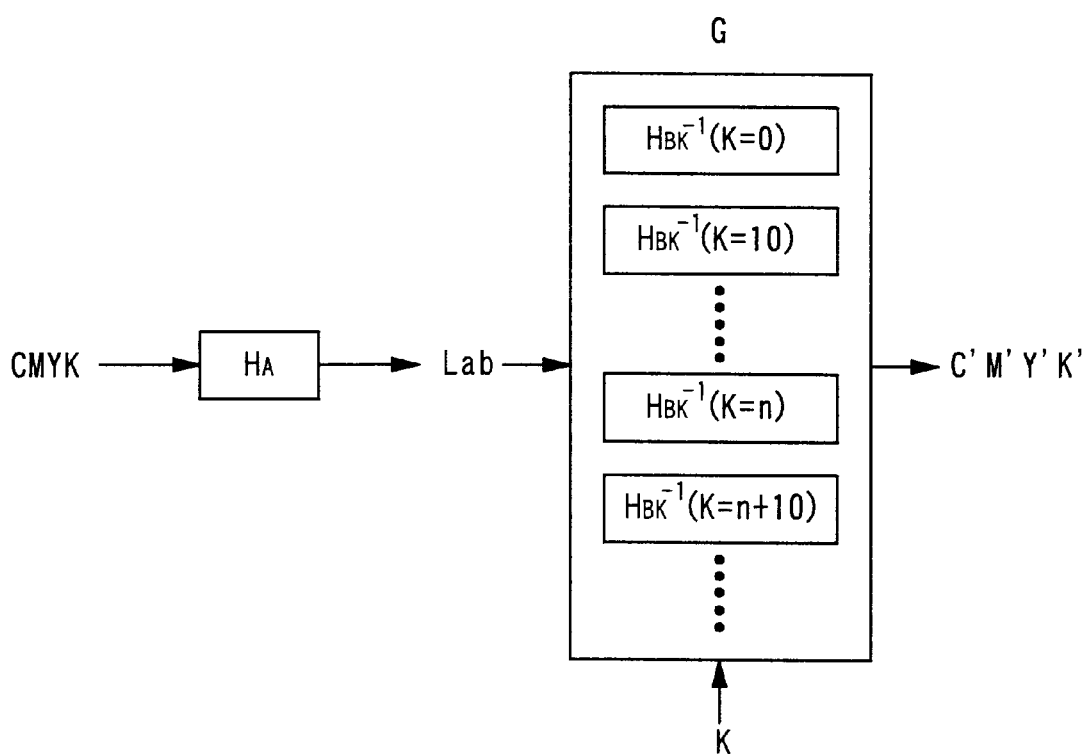
FIG. 6 is a diagram illustrative of a conversion relationship employing a forward conversion relationship and an inverse conversion relationship in the method of converting color data according to the other embodiment of the present invention.

In the above embodiment, the process of converting color data is carried out while preserving the gray balanced. More simply, the process of converting color data may be carried out as shown in FIGS. 5 and 6.

First, forward conversion functions $H_A$, $H_B$ for deriving device-independent colorimetric values L*, a*, b* from device data C, M, Y, K (C', M', Y', K') under output conditions A, B are determined in steps S1A, S1B.

Then, in the forward conversion function $H_B$, the device data K' is fixed to a predetermined value, and an inverse conversion function $H_{BK}^{-1}$ for obtaining device data C'M'Y' from arbitrary colorimetric values Lab according to:

$$C'M'Y' = H_{BK}^{-1}(Lab)$$

is determined in step S2B.

Thereafter, colorimetric values Lab with respect to arbitrary device data CMYK under the output conditions are determined according to the forward conversion function $H_A$ in step S5A'.

An inverse conversion function $H_{BK}^{-1}$ corresponding to device data K' arbitrarily established with respect to device data C'M'Y'K' under the output conditions B is selected from an inverse conversion function unit G in step S4B'. If there is no inverse conversion function $H_{BK}^{-1}$ corresponding to the device data K', then an inverse conversion function $H_{BK}^{-1}$ adjacent to the device data K' is selected or determined by interpolation.

After a range in which data can be mapped between the output conditions A and the output conditions B is adjusted in step S6, device data C'M'Y'K' under the output conditions B are determined from the inverse conversion function $H_{BK}^{-1}$ established in step S4B' and the colorimetric values Lab obtained in step S6 in step S7.

In this manner, the device data C'M'Y'K' of the destination device can easily and highly accurately be determined from the device data CMYK of the source device.

Although certain preferred embodiments of the present invention have been shown and described in detail, it should be understood that various changes and modifications may be made therein without departing from the scope of the appended claims.

What is claimed is:

1. A method of converting color data between different output conditions of a color image formed using at least four color device data, comprising the steps of:

determining a mapping from the at least four color device data under the output condition of a destination device and a source device into calorimetric values as respective forward conversion relationships for the destination device and the source device;

fixing one of said at least four colors to a predetermined value in each of said forward conversion relationships, and determining a mapping from said calorimetric values into device data of three colors of said at least four colors as inverse conversion relationships of said forward conversion relationships, for a plurality of values of said one color;

determining a relationship between a colorimetric value and device data representing a color of gray as a gray balance relationship, using the inverse conversion relationship with respect to the output conditions of the source device, and determining a mapping from said device data, in which said gray balance relationship with respect to the output conditions of the source device is maintained, into said colorimetric values as a gray balance preserving forward conversion relationship under the output conditions of the source device, for a plurality of values of one color of said at least four colors;

determining a relationship between a colorimetric value and device data representing a color of gray as a gray balance relationship, using the inverse conversion relationship with respect to the output conditions of the destination device, and determining a mapping from said colorimetric data, in which said gray balance relationship with respect to the output conditions of the destination device is maintained, into said device data as a gray balance preserving inverse conversion relationship under the output conditions of the destination device, for a plurality of values of one color of said at least four colors;

determining colorimetric values with respect to arbitrary device data under output conditions of the source device from the gray balance preserving forward conversion relationship with respect to device data of said one color of said arbitrary device data; and determining device data under the output conditions of the destination device with respect to the colorimetric values determined from said gray balance preserving forward conversion relationship, and from the gray balance preserving inverse conversion relationship with respect to device data of said one color of said device data.

2. A method according to claim 1, wherein said output conditions comprise printing conditions.

3. A method according to claim 1, wherein said device data comprise device data C, M, Y, K, said one color comprises device data K.

4. A method according to claim 1, wherein said colorimetric values comprise calorimetric values L*, a*, b* in a CIE colorimetric system.

5. A method according to claim 1, wherein said step of determining colorimetric values with respect to arbitrary device data under said output conditions of the source device comprises determining device data from said gray balance preserving inverse conversion relationship with respect to said predetermined value closest to device data of said one color of said arbitrary device data.

6. A method according to claim 1, wherein said step of determining device data under the output conditions of the destination device with respect to the calorimetric values comprises determining device data from said gray balance preserving inverse conversation relationship with respect to said predetermined value closest to device data of said one color of said device data.

7. A method according to claim 1, wherein said step of determining colorimetric values with respect to arbitrary device data under said output conditions of the source device comprises determining colorimetric values from said gray balance preserving forward conversion relationship with respect to one of said plurality of values of said one color having a value around device data of said one color of said arbitrary device data according to an interpolating process.

8. A method according to claim 7, wherein said interpolating process is weighted according to characteristics of an image produced by the device data of the source device.

9. A method according to claim 1, wherein said step of determining device data under the output conditions of the destination device with respect to the colorimetric values comprises determining device data from said gray balance preserving inverse conversion relationship with respect to one of said plurality of values of said one color having a value around device data of said one color of said device data according to an interpolating process.

10. A method according to claim 9, wherein said interpolating process is weighted according to characteristics of an image produced by the device data of the source device.

11. The method of claim 1, wherein the step of determining device data under said output conditions of the destination device further comprises using a result produced by the step of determining colorimetric values with respect to arbitrary device data under output conditions of the source device.

12. The method of claim 11, wherein the result produced by the step of determining colorimetric values with respect to arbitrary device data undergoes a gradation adjustment with respect to one of the calorimetric values prior to determining device data under the output conditions of the destination device.

* * * * *